US009096442B2

(12) United States Patent
White et al.

(10) Patent No.: US 9,096,442 B2
(45) Date of Patent: Aug. 4, 2015

(54) LOW-LOADING TITANATE INORGANIC PIGMENTS FOR USE IN INFRARED REFLECTIVE COLORS

(75) Inventors: James White, Hamilton, OH (US); Doris Montgomery, Harrison, OH (US)

(73) Assignee: The Shepherd Color Company, Cincinnati, OH (US)

( * ) Notice: Subject to any disclaimer, the term of this patent is extended or adjusted under 35 U.S.C. 154(b) by 518 days.

(21) Appl. No.: 13/540,653

(22) Filed: Jul. 3, 2012

(65) Prior Publication Data
US 2013/0008346 A1 Jan. 10, 2013

Related U.S. Application Data

(60) Provisional application No. 61/505,347, filed on Jul. 7, 2011.

(51) Int. Cl.
| | | |
|---|---|---|
| C09C 1/36 | (2006.01) | |
| C01G 23/00 | (2006.01) | |
| C04B 14/34 | (2006.01) | |
| C03C 8/00 | (2006.01) | |

(52) U.S. Cl.
CPC ........... C01G 23/003 (2013.01); *C01P 2002/52* (2013.01); *C01P 2004/62* (2013.01); *C01P 2006/60* (2013.01); *Y10T 428/2982* (2015.01)

(58) Field of Classification Search
CPC ................................ C09C 1/36; C09C 1/3653
See application file for complete search history.

(56) References Cited

U.S. PATENT DOCUMENTS

| | | | |
|---|---|---|---|
| 1,945,809 A | 2/1934 | Harbert | |
| 2,257,278 A | 9/1941 | Schaumann | |
| 3,022,186 A | 2/1962 | Hund | |
| 3,832,205 A | 8/1974 | Lowery | |
| 3,956,007 A | 5/1976 | Modly | |
| 4,844,741 A | 7/1989 | Knittel et al. | |
| 4,919,723 A | 4/1990 | Wilhelm et al. | |
| 5,006,175 A | 4/1991 | Modly | |
| 5,192,365 A | 3/1993 | Modly | |
| 6,582,506 B2 * | 6/2003 | Archambeault | 106/415 |
| 8,188,199 B1 * | 5/2012 | Al-Harthi et al. | 526/113 |
| 2008/0295737 A1 | 12/2008 | Henglein et al. | |
| 2009/0030113 A1 | 1/2009 | Glockner et al. | |
| 2010/0212552 A1 * | 8/2010 | Stratton et al. | 106/712 |
| 2011/0041726 A1 | 2/2011 | Robb et al. | |
| 2013/0048925 A1 * | 2/2013 | Edwards et al. | 252/587 |

FOREIGN PATENT DOCUMENTS

| | | |
|---|---|---|
| CN | 1840585 | 10/2006 |
| CN | 1995141 | 7/2007 |
| CN | 101341218 | 1/2009 |
| EP | 1 078 956 | 2/2001 |
| WO | WO 00/00432 | 1/2000 |
| WO | WO 2011/101657 | 8/2011 |

OTHER PUBLICATIONS

Terence J. Kemp, Robin A. McIntyre, "Influence of transition metal-doped titanium (IV) dioxide on the photodegradation of polyethylene", Oct. 11, 2006, Department of Chemistry, University of Warwick, Coventry CV4 7AL, UK.*
"Classification and Chemical Description of the Complex Inorganic Color Pigments", 3$^{rd}$ Ed., 1991, Colored Pigment Manufacturer's Association.
Lewis, P.A., ed., "Pigment Handbook", vol. 1 Properties and Economics, 2$^{nd}$ Ed., John Wiley & Sons, 1998.
MacDonald Smith, H., "High Performance Pigments", Wiley-VCH, 2002.
Abstract and English Machine Translation of German Application No. EP 1 078 956.
International Search Report dated Oct. 31, 2012 for Application No. PCT/US2011/045370.
Kemp, T.J., et al., Transition metal-doped titanium(IV) dioxide: Characterisation and influence on photodegradation of poly(vinyl chloride), Polymer Degradation and Stability, 91 (2006), pp. 165-194.
Chinese Office Action dated Dec. 31, 2014 for Application No. CN 201280033595X.
Zheng, G., "Infrared reflective pigment and the applications thereof", Shanghai Paintings, Dec. 31, 2008, 46(12), pp. 19-23.

* cited by examiner

*Primary Examiner* — Pegah Parvini
(74) *Attorney, Agent, or Firm* — Frost Brown Todd LLC (57) ABSTRACT

Complex inorganic titanate pigments with low dopant levels (i.e., less than about 5%) exhibit coloristic and enhanced infrared (IR) reflectance characteristics that make them useful in formulating colors exhibiting high IR reflectivity. This characteristic is becoming increasingly useful as a way to keep exterior surfaces and articles cooler during exposure to direct sunlight. Achieving this can decrease energy (e.g., cooling/air conditioning) consumption and costs. Low-loaded titanates can boost IR reflectivity by 1 to 10% in selected visual color spaces. Paint compositions containing those low loaded titanate pigments and a method for providing a surface with high infrared reflectance utilizing those pigments are also disclosed.

17 Claims, 6 Drawing Sheets

Figure 3. Color and IR Comparison Low-loading Pigment Yellow 163 vs. Color Match

LOW-LOADING TITANATE INORGANIC PIGMENTS FOR USE IN INFRARED REFLECTIVE COLORS

This application is based on and claims priority from U.S. Provisional Patent Application Ser. No. 61/505,347, White and Montgomery, filed Jul. 7, 2011, incorporated by reference herein.

TECHNICAL FIELD

The present invention relates to the field of color pigments, specifically color pigments which exhibit high levels of infrared (IR) reflectance. In particular, the present invention relates to titanate-based complex inorganic color pigments (CICPs) with low dopant levels (low loading) and their use in the formulation of high IR reflective materials which can be used to color substrates such as plastics, paints, coatings, ceramics and glass enamels.

BACKGROUND

Complex inorganic colored pigments are based upon crystalline mixed-metal oxide materials. This class of materials is well-known in the art and is described, for example, in *High Performance Pigments* by Hugh MacDonald Smith, Wiley-VCH, 2002, and the published brochure, *Classification and Chemical Description of the Complex Inorganic Color Pigments*, 3$^{rd}$ Ed., 1991, Colored Pigment Manufacturer's Association (formerly the Dry Color Manufacturer's Association), both incorporated herein by reference. Another reference which describes CICPs is the *Pigment Handbook*, Vol. 1 Properties and Economics, 2$^{nd}$ Ed., Peter A. Lewis (ed.), John Wiley & Sons, 1988 (see particularly chapters C.e.2, C.e,3, C.e.6, and C.e.7), incorporated herein by reference.

The use of the term "Complex Inorganic Color Pigments" is a relatively recent one. These pigments have been referred to as ceramic pigments, synthetic inorganic complexes and mixed metal oxides. They are, in fact, all of these. Complex inorganic color pigments are man-made materials in violet, blue, green, yellow, brown and black that are calcined at temperatures between 800 and 1,300 degrees Celsius. In the past, these pigments were used primarily to color ceramics. Today, they are one of the most important pigment classes used to color plastics and coatings. Complex inorganic color pigments are known to be heat stable, light fast, chemically resistant and weatherable.

Colors or colorants are made up of pigments and dyes. The Color Pigment Manufacturer's Association defines a pigment as "colored, black, white or fluorescent particulate organic or inorganic solids that are usually insoluble in and essentially physically and chemically unaffected by, the vehicle or substrate in which they are incorporated. They alter appearance by selective adsorption and/or scattering of light. Pigments are usually dispersed in vehicles or substrates for application, as for instance, in the manufacture of inks, paints, plastics or other polymeric materials. Pigments retain a crystal or particulate structure throughout."

The present invention relates to the manufacture and use of titanate-based CICPs that have low metal loading (doping) levels compared with traditional CICPs. Examples of titanate-based pigments, which can be used as bases for the present invention, include the following:

C.I. Pigment Brown 24
C.I. Pigment Brown 37
C.I. Pigment Brown 40
C.I. Pigment Brown 45
C.I. Pigment Yellow 53
C.I. Pigment Yellow 161
C.I. Pigment Yellow 162
C.I. Pigment Yellow 163
C.I. Pigment Yellow 164
C.I. Pigment Yellow 189
C.I. Pigment Black 12
C.I. Pigment Black 24

The normal variety of titanate-based CICP materials in commerce today has relatively high metal doping levels (i.e., greater than about 10% by weight). As used herein, "doping level" or "loading level" refers to the amount of replacement by weight of $TiO_2$ in the titanate lattice structures. For example, C.I. Pigment Brown 24 is made of a rutile titanium dioxide-based crystal doped with chromium (III) oxide (coloring oxide) and antimony (V) oxide (colorless charge balancing oxide). A typical composition of that homogeneous pigment in ceramic nomenclature is described in the *Pigment Handbook*, at page 383, as follows: $Cr_2O_3.Sb_2O_5.31TiO_2$. In this compound, the following are the weight percents of the component elements:

Cr=3.52%
Sb=8.25%
Ti=50.29%
O=37.94%

Total doping metal content (Cr(III) and Sb(V))=3.52+8.25=11.77%

Such a formulation and other formulations with even higher metal loadings, typically between about 10 and about 20% of the total $TiO_2$ by weight replaced by the Cr and Sb oxides, describe a common commercial C.I. Pigment Brown 24 pigment. Most conventional CICPs in today's marketplace tend to have doping levels nearer to about 20% replacement level. The reason for high levels of doping in conventional CICPs is two-fold: first, it provides a brighter color for the pigment, and second, it helps give the resulting pigment good tinting strength.

Doped rutile pigments are described in the following U.S. patents; none of them describe or include examples of doping levels less than 5%:

U.S. Pat. No. 1,945,809, Herbert, issued Feb. 6, 1934
U.S. Pat. No. 2,257,278, Schaumann, issued Sep. 30, 1941
U.S. Pat. No. 3,022,186, Hund, issued Feb. 20, 1962
U.S. Pat. No. 3,832,205, Lowery, issued Aug. 27, 1974
U.S. Pat. No. 3,956,007, Modly, issued May 11, 1976

Each of the following patents describes the use of modifiers to improve some property of the defined pigments. The '175 patent discusses improving infrared reflectivity. None of these patents suggests doping levels below 5%:

U.S. Pat. No. 4,844,741, Knittel et al, issued Jul. 4, 1989
U.S. Pat. No. 4,919,723, Wilhelm et al, issued Apr. 24, 1990
U.S. Pat. No. 5,006,175, Modly, issued Apr. 9, 1991
U.S. Pat. No. 5,192,365, Modly, issued Mar. 9, 1993
EPO Published Patent Application 1 078 956, Reisacher et al, published Feb. 28, 2001

Finally, PCT Published Patent Application WO 2011/101657, Edwards et al, published Aug. 25, 2011, suggests using rutile $TiO_2$, at a larger size than typical, in conjunction with colored organic pigments to provide improvement in IR reflectance. Colored titanate pigments may also be combined with organic pigments in the disclosed compositions.

Solar radiation reaching the earth's surface covers a spectral range starting at about 300 nanometers (nm) and trailing off in the infrared region at about 2,500 nm. Solar radiation peaks in the visible spectral range. Still, roughly 50% of the radiation reaching the earth's surface is in the IR spectral region. This IR radiation contributes to heat build-up in exposed articles. Most of this results from radiation which is absorbed by a substrate and is converted into heat, thereby heating the entire object. An example of this would be a building, such as a storage facility, which is built from metal sheets or even cinder blocks, and which is located in a temperate (or even tropical) area. The sun beating down on this building during the late Spring and Summer months would, as a result of infrared absorption, heat the interior space of the building, thereby affecting the materials which are stored in the building.

In order to keep exposed surfaces cooler, efforts have been ongoing to increase the surfaces' infrared (IR) reflectivity. The more solar IR radiation that is reflected away from the surface, the less is absorbed and the cooler a surface will remain upon direct exposure. Achieving higher IR reflectance and cooler surfaces, can result in decreased energy consumption and lower energy costs.

The present invention provides coloring materials that are useful in boosting the solar IR reflectivity in articles in which they are used as a pigment in place of more common and conventional pigments.

SUMMARY

The present invention relates to a complex inorganic titanate pigment having a loading of colored metal ions and their charge-balancing ions of less than about 5% (for example, less than about 2%) by weight, and an average particle size of from about 0.3 to about 5 µm (for example, from about 1 to about 3 µm).

The present invention also relates to high infrared reflective paint (as well as other coating) compositions, as well as plastics, ceramics, glass enamels, concrete and other systems requiring high durability color, which comprise an effective amount of the pigment defined above. Finally, the present invention relates to a method for providing a surface with both visual color and high infrared reflectivity comprising the step of coating said surface with the paint composition defined above.

As used herein, all percentages and ratios are "by weight", unless otherwise specified. Further, references listed in this application are all incorporated by reference herein.

DETAILED DESCRIPTION

As used herein, the phrase "effective amount" means an amount of pigment which can be incorporated into a paint or other product so as to provide a desired color and IR reflectivity, without providing undesired formulational difficulties.

Further, as used herein, the phrase "substantially free" of a particular component, means that the defined product contains no greater than about 5% by weight of the particular component (from which it is said to be "substantially free"), for example, no greater than about 2% of said component, or no greater than about 1% of said component.

The present application relates to the preparation and use of a range of titanate-based CIPCs that contain an unusually low level (i.e., low loading) of coloring and charge balancing oxide metal doping materials. The low-loading of coloring and balancing metal oxides results in a CICP of unusually high infrared reflectivity. These low loaded CICPs can be used alone or in combination to increase the IR reflectivity in pigmented materials in which they are employed.

The low-loaded titanate-based CIPCs of the present invention include less than about 5% by weight of coloring and charge balancing metal oxide components. Exemplary embodiments of the materials include no greater than about 4% of such doping elements; less than about 2% of such doping elements; or no greater than about 1% of such doping elements. These levels are considered low in comparison to commercially-available CICP materials.

In preparing the CICPs of the present invention, the pure constituent oxides are dry-blended together to form a raw material blend. This blend is calcined at temperatures between about 800° C. and about 1,300° C., for about 4 to about 12 hours. The calcined product is cooled and milled to a pigmentary particle size post-calcining. For example, jet milling, pulverizing and other particle size reduction techniques known in the art can be used. The particles produced may have an average size of from about 0.3 to about 5 microns in diameter, for example, from about 0.5 to about 5 microns, from about 1 to about 5 microns, or from about 1 to about 3 microns in diameter.

Once prepared, the pigment is employed in coloring a substrate in order to impart visual color and also to provide maximum IR reflectance for the given visual color. High IR reflectivity is required in circumstances where avoiding excessive heat buildup from exposure to ambient sunlight is desirable. CICPs are generally used in demanding applications where resistance to chemicals, weather, light and heat are required. The present invention is particularly useful for, but not limited to, these types of applications.

The pigments of the present invention may be used as the sole colorant in a composition or may be used in combination with other dyes and/or pigments. In one embodiment, the composition contains a pigment of the present invention and is substantially free of organic pigments.

The CICPs described herein may be used, for example, as the coloring element in paint compositions or as the coloring element in objects, such as plastic, ceramic, concrete or glass enamel objects, which require coloration. The manner of formulating such objects is well-known to those skilled in the art. In a paint composition, the pigment is blended with a paint vehicle and other conventional paint components which are well-known to those skilled in the art. Examples of such conventional paint components include: binders; vehicles; solvents; modifiers of surface tension, flow properties, foaming, wet edge, skinning, antifreeze properties and pigment stability; catalysts; thickeners; stabilizers; emulsifiers; texturizers; adhesion promoters; UV stabilizers; flatteners (deglossing agents); and biocides.

In one embodiment of the present invention, a paint composition is formulated so as to contain, as pigment materials, only the low-loaded pigments of the present invention, and is substantially free of any other pigment materials. Further, in an embodiment of the present invention, the paint composition is formulated so as to contain, as pigment materials, low-loaded pigments of the present invention and be substantially free of all other titanate-derived pigment materials.

In commercially-available (prior art) CICPs, the high metal loadings used to maximize color and tinting strength result in the absorption bands that yield the desired visual color to become stronger and broadened over a larger spectral scale. This effect makes the commercial pigments less reflective visually but, more importantly, less reflective in the IR spectral region. This effect is intrinsic to the pigment and is not fully overcome by adding more titanium dioxide white in a color match. To state this more specifically, a low-loading CICP, as defined in the present application, will be more reflective than an equivalent combination of a common (prior art) commercial grade of the CICP together with $TiO_2$ white. This fundamental difference is where the usefulness of the present invention is observed. Low-loading CICPs, as defined herein, can be used to make more infrared reflective color combinations. This is best shown by the examples of the reflection curves of the common commercial CICPs compared with the low loading CICPs of the present invention, illustrated in FIGS. 1-6.

Most opaque colors are made using a combination of pigments. Simple colors, such as tints, are combinations of a color pigment plus a white pigment, most typically $TiO_2$ white. More complex colors use a larger number of pigments. Multiple formulations can yield virtually the same visual color. However, pigments have a wide variety of infrared reflectivities and the choice of pigment in a particular color match can have a large impact on the overall IR reflectivity of the resulting color.

Set forth below are some specific examples of the present invention. These examples are merely illustrative compositions that can be made utilizing the present invention. It is not in any way intended that the scope of the present invention be limited by such examples.

Example 1

Common Commercial Inorganic Pigment Color Match Vs. a Low-Loaded C.I. Pigment Brown 45

In this example, a low-loading C.I. Pigment Brown 45 is prepared by dry blending pigment grade oxide powders of $TiO_2$, $Mn_3O_4$, and $WO_3$ in a ratio of $425TiO_2:2WO_3:1Mn_3O_4$. The dry blends were calcined in air for 5 hours at 1,100 C, yielding a uniform light brown powder. The calcined powder is finish milled to reduce the average particle size to a range of 1 to 3 microns. This synthesis prepares a pigment grade material containing 98% $TiO_2$.

The prepared low-loading Pigment Brown 45 is made into a commercially available acrylic automotive paint or coating for evaluation. An example would be PPG DMR 499 resin. Test paints were made to have 28.5% pigment in liquid paint. For evaluation, the paint is drawn down in a uniform film using, for example, a 10-mil bird gauge, yielding a visually opaque dry film containing 55% pigment that is between 2 and 3 mils in film thickness.

A similar visually colored paint or coating is prepared from a blend of common conventional pigments; $TiO_2$ white, C.I. Pigment Green 17, C.I. Pigment Red 101, and C.I. Pigment Brown 24. This blend of pigments, called a color match, is made into an acrylic paint or coating at 28.5% pigment total pigment. The paint is drawn down in a uniform film using a 10-mil bird gauge, yielding a visually opaque dry film containing 55% pigment that is between 2 and 3 mils in film thickness.

Figure 1:
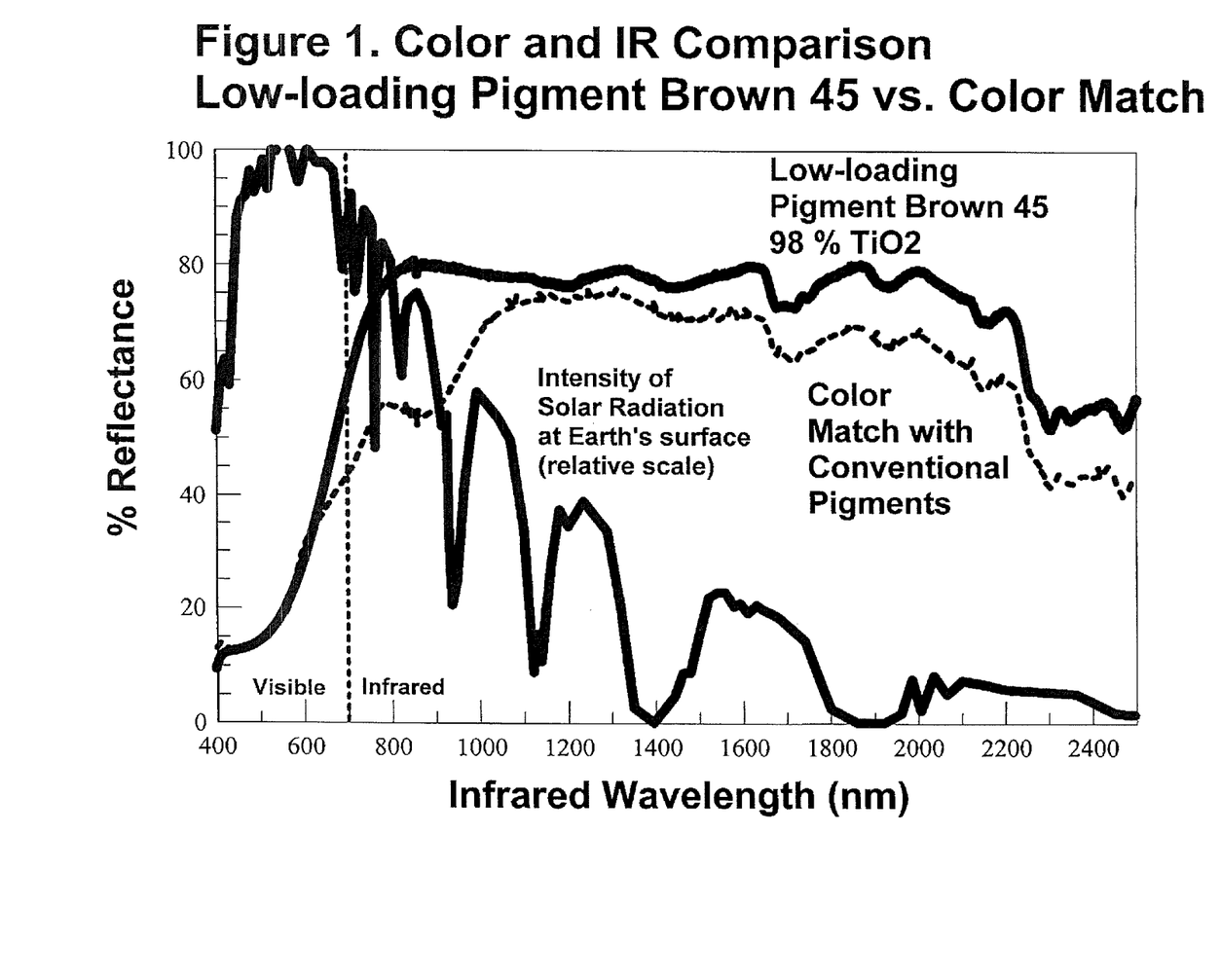
FIG. 1 shows the reflective spectra of a paint containing a pigment of the present invention and a control paint containing conventional pigments, as described in Example 1.

To compare the two films, the reflective spectra of each is measured in the 300 to 2,500 nm spectral range. The spectra are shown in FIG. 1. Also included in FIG. 1 is a mapping of the intensity of the solar radiation at the earth's surface as a function of wave length (using a relative scale).

From the spectral plot it can be seen that the low-loaded pigment Brown 45 of the present invention makes a color which is more reflective in the IR wavelengths, when compared to the paint formulated with conventional pigments. A measure of the importance of this difference can be seen by looking at the plot of relative intensity of sunlight at the earth's surface which is included for reference. It can be seen that the sunlight intensity is highest in the shorter IR wave lengths from 700 to 900 nm. In this region, the low-loaded pigment Brown 45 shows the greatest difference and advantage in IR reflectivity when compared with the conventional pigment match.

One way to numerically compare one color vs. another in solar reflectivity is to use a device to measure the total solar reflectivity. Such a device, called an SSR-ER (for example, the one sold by Devices & Services, a Solar Spectrum Reflectometer, Model SSR-ER), can provide a comparative number that is defined as Total Solar Reflectivity (measured as a percent). % TSR, which means Total Solar Reflectance, takes reflectance values for the wave length range 200-2,500 nm (solar energy) and applies the solar incident radiation, weighted for each wave length. This value is used to determine how hot a color will be in the sunlight and to rank colors against each other in terms of heat absorption and high IR reflectivity. The higher the % TSR value, the more a sample reflects sunlight. In Example 1, the low-loaded Brown 45 has a % TSR value of 52%, while the visual color match has a % TSR of 46%.

Example 2

Common Commercial Inorganic Pigment Color Match Vs. a Low-Loaded C.I. Pigment Yellow 162

In this example, a low-loading C.I. Pigment Yellow 162 is prepared by dry blending pigment grade oxide powders of $TiO_2$, $Cr_2O_3$, and $Nb_2O_5$ in a ratio of $312TiO_2:1Nb_2O_5:1Cr_2O_3$. The dry blends were calcined in air for 5 hours at 1,170 C, yielding a uniform light yellow powder. The calcined powder is finish milled to reduce the average particle size to a range of 1 to 3 microns. This synthesis prepares a pigment grade material containing 98% $TiO_2$.

The prepared low-loaded Pigment Yellow 162 is made into a commercially available acrylic automotive paint or coating for evaluation. An example would be PPG DMR 499 resin. Test paints were made to have 28.5% pigment in liquid paint. For evaluation, the paint is drawn down in a uniform film using, for example, a 10-mil bird gauge, yielding a visually opaque dry film containing 55% pigment that is between 2 and 3 mils in film thickness.

A similar visually colored paint or coating is prepared from a blend of common conventional pigments; $TiO_2$ white, C.I. Pigment Yellow 53, C.I. Pigment Red 101, and C.I. Pigment Brown 24. This blend of pigments, called a color match, is made into an acrylic paint or coating at 28.5% pigment total pigment. The paint is drawn down in a uniform film using a 10-mil bird gauge, yielding a visually opaque dry film containing 55% pigment that is between 2 and 3 mils in film thickness.

Figure 2:
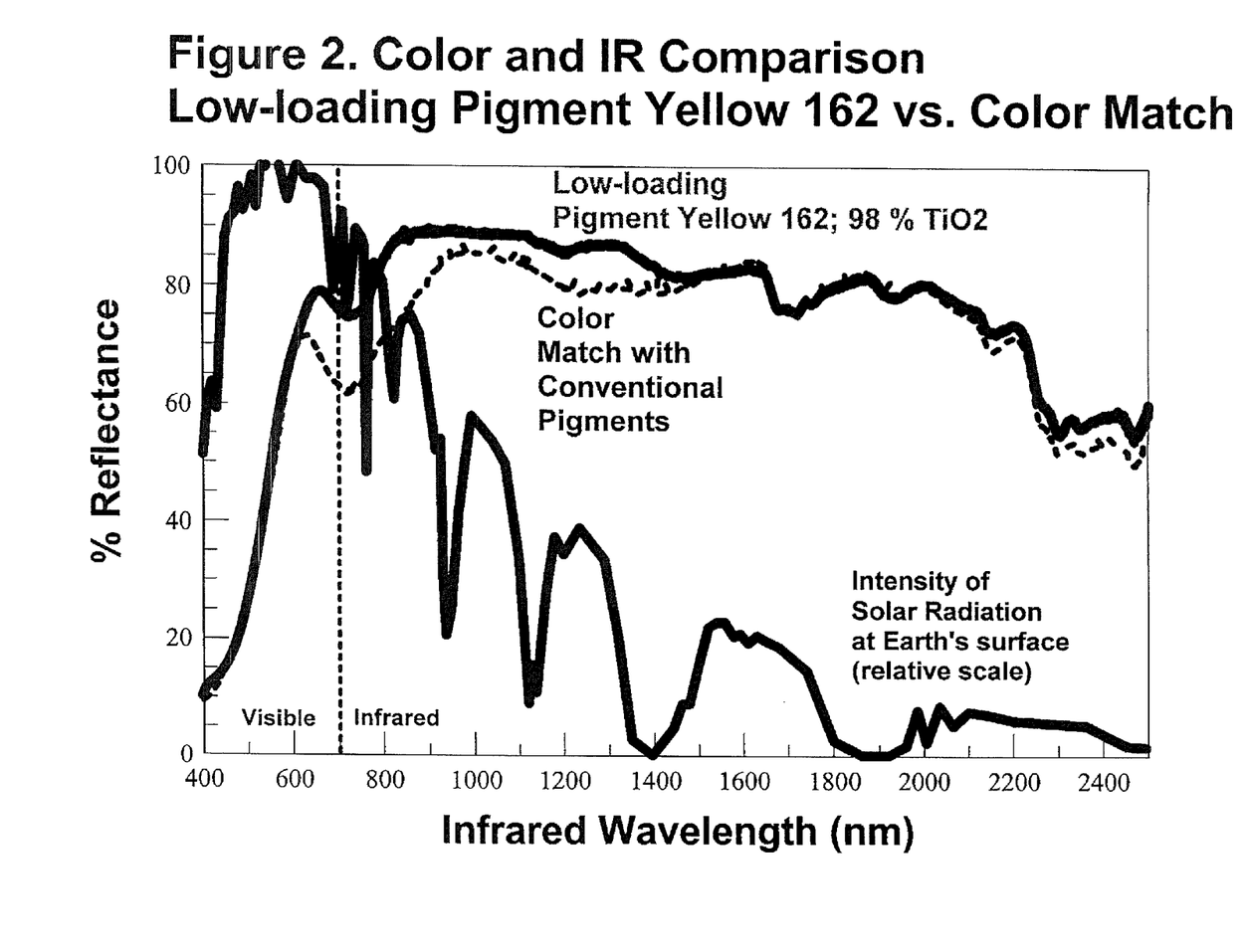
FIG. 2 shows the reflective spectra of a paint containing a pigment of the present invention and a control paint containing conventional pigments, as described in Example 2.

The reflective spectra of each of these paints is measured. The spectra are shown in FIG. 2.

The low-loaded Pigment Yellow 162 yields a color with more IR reflectivity when compared to the conventional pigment match composition. The low-loaded Pigment Yellow 161 has a % TSR value of 66%, while the conventional pigment match has a % TSR of 63%.

Example 3

Common Commercial Inorganic Pigment Color Match Vs. a Low-Loaded C.I. Pigment Yellow 163

In this example, a low-loading C.I. Pigment Yellow 163 is prepared by dry blending pigment grade oxide powders of $TiO_2$, $Cr_2O_3$, and $WO_3$ in a ratio of $554TiO_2:1WO_3:1Cr_2O_3$. The dry blends were calcined in air for 5 hours at 1,100 C, yielding a uniform light brown powder. The calcined powder is finish milled to reduce the average particle size to a range of 1 to 3 microns. This synthesis prepares a pigment grade material containing 99% $TiO_2$.

The prepared low-loaded Pigment Yellow 163 is made into a commercially available acrylic automotive paint or coating for evaluation. An example would be PPG DMR 499 resin. Test paints were made to have 28.5% pigment in liquid paint. For evaluation, the paint is drawn down in a uniform film using, for example, a 10-mil bird gauge, yielding a visually opaque dry film containing 55% pigment that is between 2 and 3 mils in film thickness.

A similar visually colored paint or coating is prepared from a blend of common conventional pigments; $TiO_2$ white, C.I. Pigment Yellow 53 and C.I. Pigment Brown 24. This blend of pigments called a color match, is made into an acrylic paint or coating at 28.5% pigment total pigment. The paint is drawn down in a uniform film using a 10-mil bird gauge, yielding a visually opaque dry film containing 55% pigment that is between 2 and 3 mils in film thickness.

Figure 3:
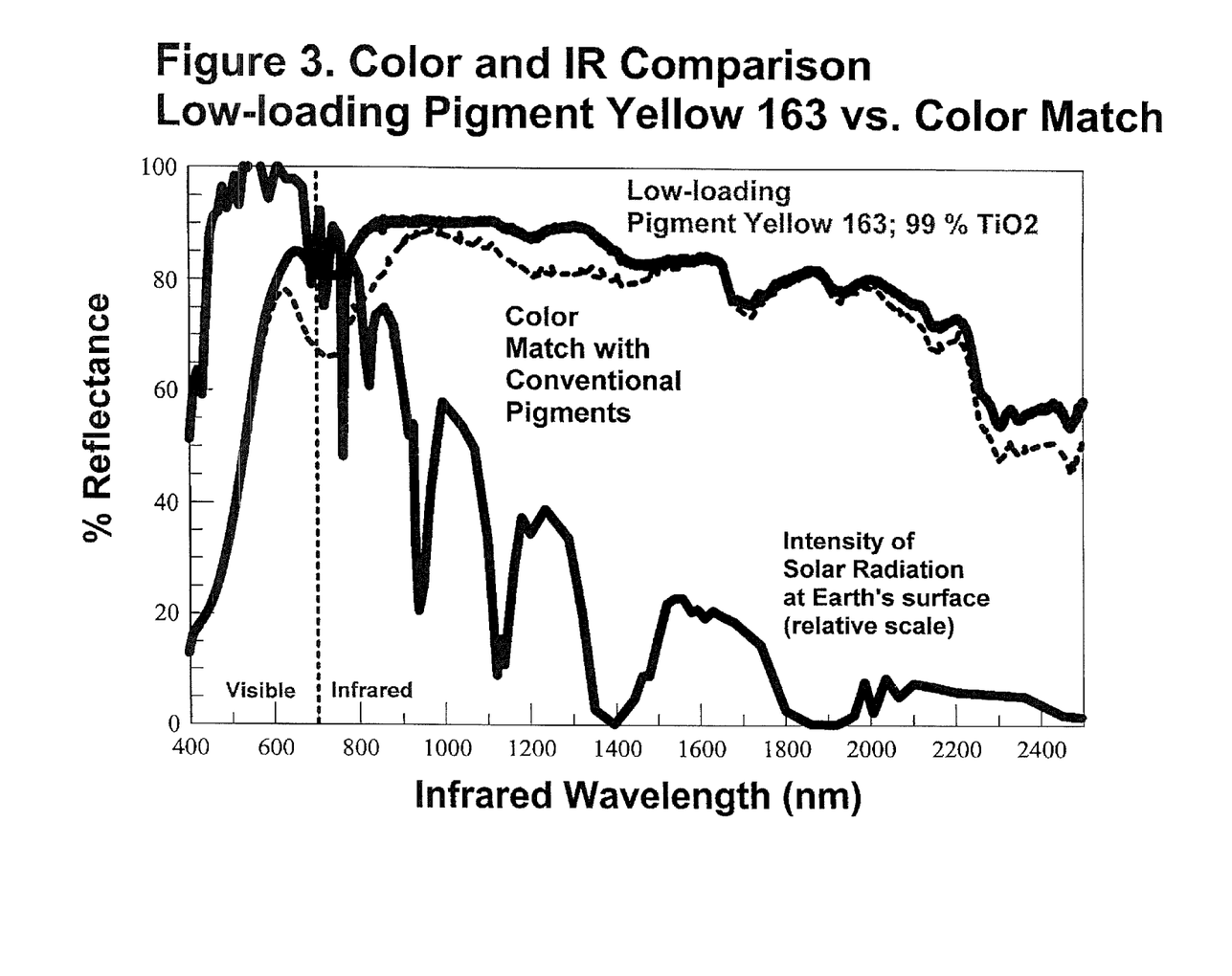
FIG. 3 shows the reflective spectra of a paint containing a pigment of the present invention and a control paint containing conventional pigments, as described in Example 3.

The reflective spectra of each of these paints can be measured. These are shown in FIG. 3.

The low-loaded Pigment Yellow 163 yields a color with more IR reflectivity compared to the pigment made with the conventional color match pigment. The low-loaded Pigment Yellow 163 has a % TSR value of 70%, while the color match pigment has a % TSR of 66%.

Example 4

Common Commercial Inorganic Pigment Color Match Vs. a Low-Loading C.I. Pigment Yellow 164

In this example, a low-loading C.I. Pigment Yellow 164 is prepared by dry blending pigment grade oxide powders of $TiO_2$, $Mn_3O_4$, and $Sb_2O_3$ in a ratio of $164TiO_2:2Sb_2O_3:1Mn_3O_4$. The dry blends were calcined in air for 5 hours at 1,050 C, yielding a uniform light brown powder. The calcined powder is finish milled to reduce the average particle size to a range of 1 to 3 microns. This synthesis prepares a pigment grade material containing 98% $TiO_2$.

The prepared Pigment Yellow 164 is made into a commercially available rigid PVC plaque for evaluation. An example would be Georgia Gulf Type 3304-AT00. Test plaques were made to have a total of 5% pigment in the finished plaque. For evaluation, the pigment and PVC resin are dry mixed then melted and press-molded to form a flat plaque for color and reflectivity measurements.

A similar visually colored PVC plaque is prepared from a blend of common conventional pigments: $TiO_2$ white, C.I. Pigment Yellow 164, C.I. Pigment Red 101, and C.I. Pigment Brown 24. This blend of pigments, called a color match, is made into a PVC plaque at 5% total pigment, as above. The plaque is made in a similar method to that mentioned above for evaluation.

Figure 4:
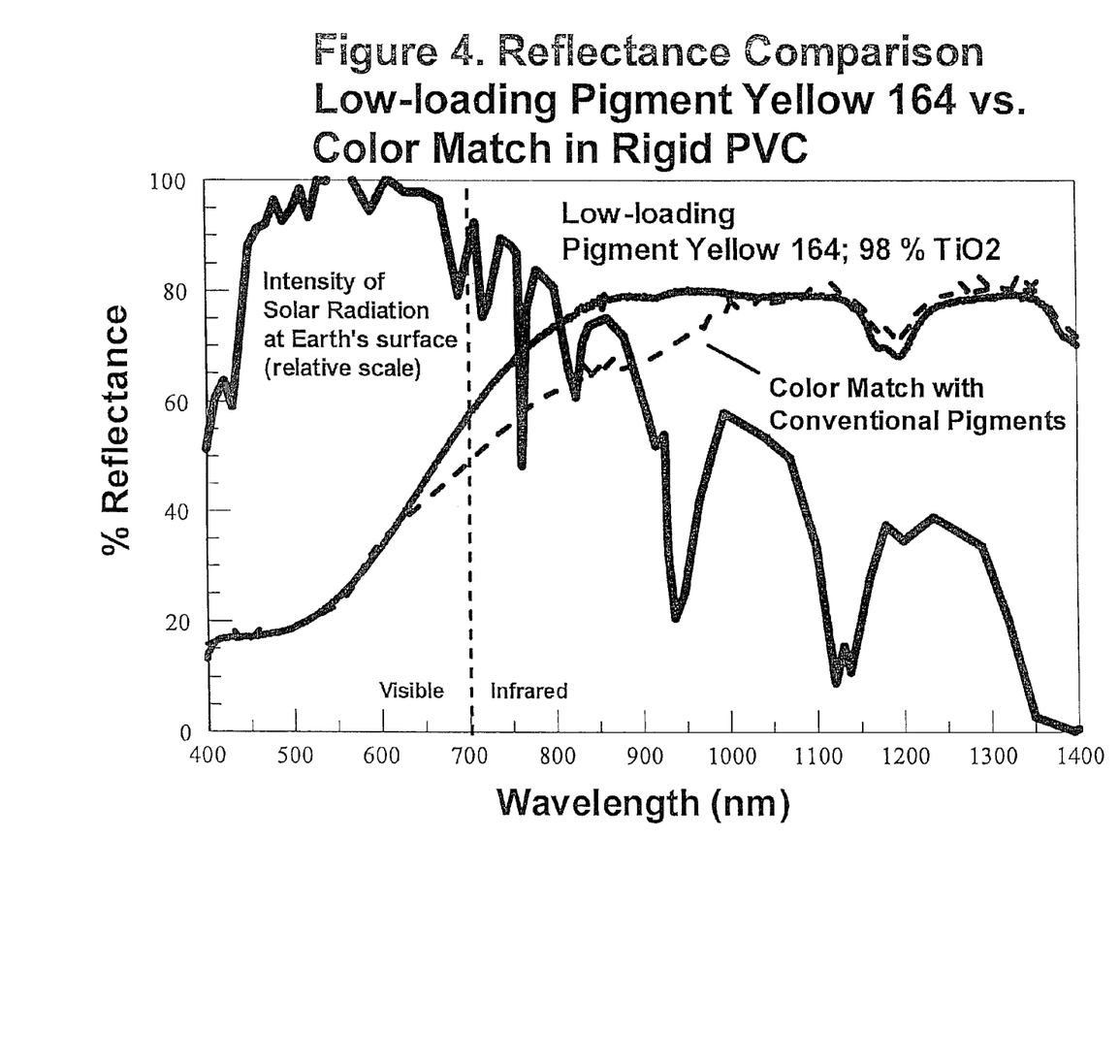
FIG. 4 shows the reflective spectra of a colored PVC plaque containing a pigment of the present invention and a control PVC plaque containing conventional pigments as described in Example 4.

The reflectance curves for the samples, prepared above, are shown in FIG. 4. The low-loading Pigment Yellow 164 yields an equivalent visual color with more IR reflectivity compared to the conventional pigment match. Examination of the reflectance curves shows the greater IR reflectivity of the low-loading Pigment Yellow 164 in the spectra region from 600 to 1,000 nm. As a result of this difference, the low-loading Pigment Yellow 164 has a % TSR value of 55%, while the conventional pigment match measures lower at 53%.

Example 5

Common Commercial Inorganic Pigment Color Match Vs. a Low-Loading C.I. Pigment Brown 24

In this example, a low-loading C.I. Pigment Brown 24 is prepared by dry blending pigment grade oxide powders of $TiO_2$, $Cr_2O_3$, and $Sb_2O_3$ in a ratio of $164TiO_2:2Sb_2O_3:1Cr_2O_3$. The dry blends were calcined in air for 5 hours at 1,050 C, yielding a uniform light yellow powder. The calcined powder is finish milled to reduce the average particle size to a range of 1 to 3 microns. This synthesis prepares a pigment grade material containing 98% $TiO_2$.

The prepared Pigment Brown 24 is made into a commercially available rigid PVC plaque for evaluation. An example would be Georgia Gulf Type 3304-AT00. Test plaques were made to have a total of 5% pigment in the finished plaque. For evaluation, the pigment and PVC resin are dry mixed then melted and press-molded to form a flat plaque for color and reflectivity measurements.

A similar visually colored PVC plaque is prepared from a blend of common conventional pigments: $TiO_2$ white, C.I. Pigment Yellow 53, C.I. Green 17, and C.I. Pigment Brown 24. This blend of pigments, called a color match, is made into a PVC plaque at 5% total pigment as above. The plaque is made in a similar method to that mentioned above for evaluation.

Figure 5:
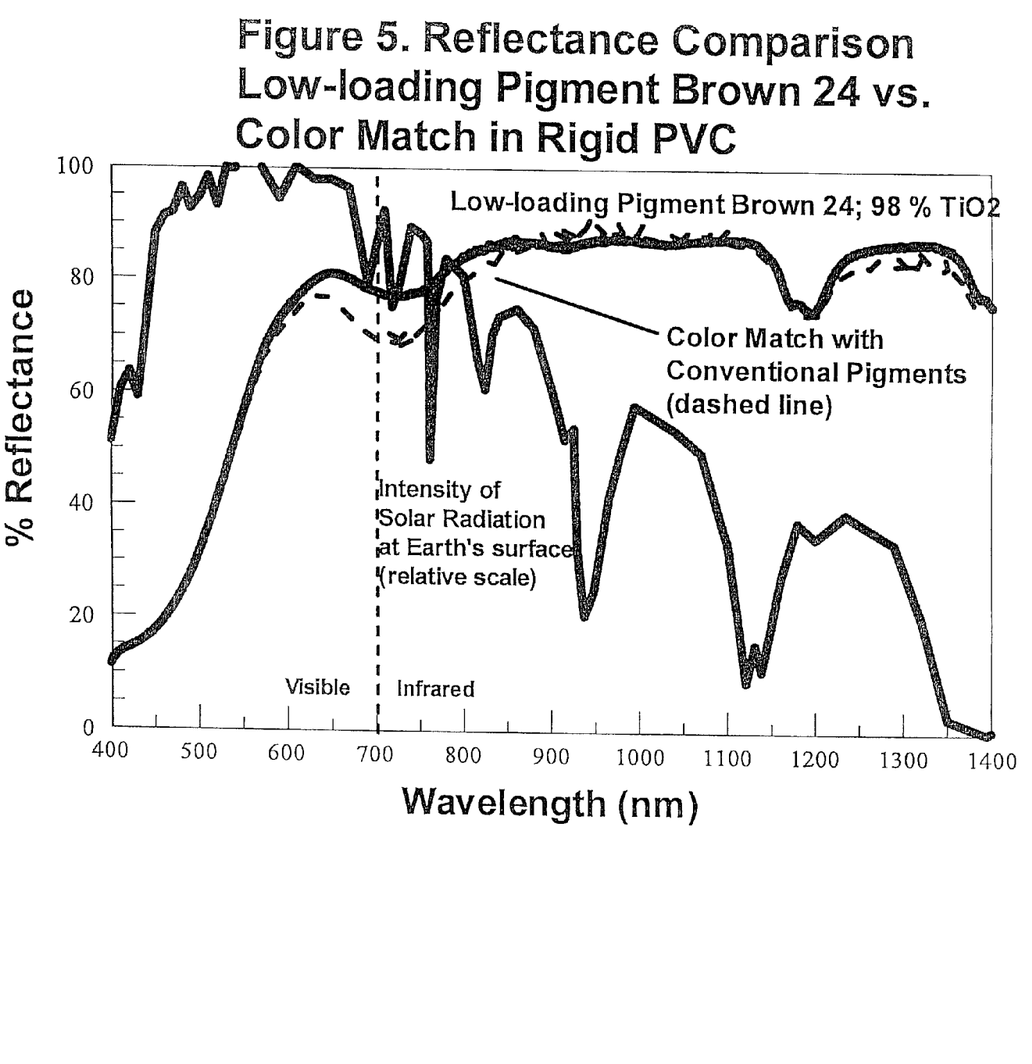
FIG. 5 shows the reflective spectra of a colored PVC plaque containing a pigment of the present invention and a control PVC plaque containing conventional pigments as described in Example 5.

The reflectance curves for the samples, prepared above, are shown in FIG. 5. The low-loading Pigment Brown 24 yields an equivalent visual color with more IR reflectivity compared to the conventional pigment match. Examination of the reflectance curves shows the greater IR reflectivity of the low-loading Pigment Yellow 164 in the spectra region from 650 to 850 nm. As a result of this difference, the low-loading Pigment Yellow 164 has a % TSR value of 70%, while the conventional pigment match measures lower at 68%.

Example 6

Common Commercial Inorganic Pigment Color Match Vs. a Low-Loading C.I. Pigment Yellow 164

In this example, a low-loading C.I. Pigment Yellow 164 is prepared by dry blending pigment grade oxide powders of $TiO_2$, $Sb_2O_3$, $Mn_3O_4$, and $WO_3$, in a ratio of $173TiO_2:1.1Sb_2O_3:1Mn_3O_4:0.2WO_3$. The dry blends were calcined in air for 5 hours at 1,000 C, yielding a uniform light brown powder. The calcined powder is finish milled to reduce the average particle size to a range of 1 to 3 microns. This synthesis prepares a pigment grade material containing 96% $TiO_2$.

The prepared Pigment Yellow 164 is made into a commercially available rigid PVC plaque for evaluation. An example would be Georgia Gulf Type 3303-AT00. Test plaques were made to have a total of 5% pigment in the finished plaque. For evaluation, the pigment and PVC resin are dry mixed then melted and press-molded to form a flat plaque for color and reflectivity measurements.

For comparison, two similar visually colored PVC plaques are prepared from a blend of common conventional pigments of similar color space also used in PVC siding. The samples of traditional pigments are cut with $TiO_2$ white in order to produce a color with equal light/dark value (equal L* value) for this comparison.

The first sample is made from a mixture of 69% $TiO_2$ white and 31% C.I. Pigment Brown 33. The blend of pigments is made into PVC plaque at 7.2% total pigment, as above. The plaque is made in a similar method to that described above for evaluation.

The second plaque is prepared from a mixture of 80% $TiO_2$ white and 20% C.I. Pigment Black 12. The blend of pigments is made into PVC plaque at 6.2% total pigment, as above. The plaque is made in a similar method to that described above for evaluation.

Figure 6:
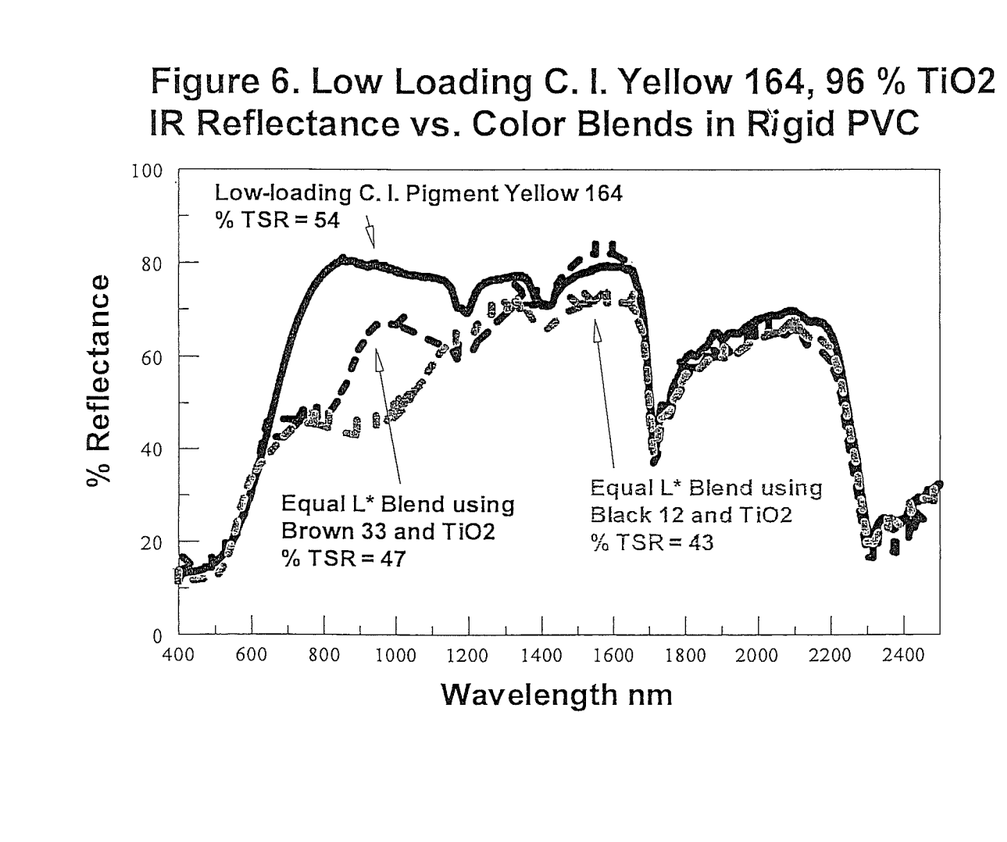
FIG. 6 shows the reflective spectra of a colored PVC plaque containing a pigment of the present invention and two control PVC plaques containing conventional pigments as described in Example 6.

The reflectance spectra of each PVC plaque was measured. These are shown in FIG. 6.

All six of these examples demonstrate that the pigments of the present invention, and particularly paint or plastic compositions formulated using those pigments, exhibit a higher infrared reflectance when compared with conventional pigments formulated so as to match the color of the pigment of the present invention.

Similar results are seen using other low-loaded titanate pigments of the present invention, or when the low-loaded pigments are used in, for example, other types of paint, plastic, ceramic, glass enamel or concrete formulations.

What is claimed is:

1. Complex inorganic titanate pigments having a loading of coloring metal ions and their charge balancing ions of no greater than 4% by weight, and an average particle size of from about 0.3 to about 5 μm.

2. The pigments according to claim 1 having an average particle size of from about 1 to about 5 μm.

3. The pigments according to claim 2 having a loading of coloring metal ions and their charge balancing ions of no greater than about 2%.

4. The pigments according to claim 3 having a loading of coloring metal ions and their charge balancing ions of no greater than about 1%.

5. The pigments according to claim 2 having an average particle size of from about 1 to about 3 μm.

6. The pigment according to claim 5 based on a pigment selected from C.I. Pigment Brown 24, C.I. Pigment Brown 37, C.I. Pigment Brown 40, C.I. Pigment Brown 45, C.I. Pigment Yellow 53, C.I. Pigment Yellow 161, C.I. Pigment Yellow 162, C.I. Pigment Yellow 163, C.I. Pigment Yellow 164, C.I. Pigment Yellow 189, C.I. Pigment Black 12, C.I. Pigment Black 24, and combination thereof.

7. A high infrared reflective paint composition comprising an effective amount of the pigment according to claim 1, in a paint vehicle.

8. A high infrared reflective paint composition comprising an effective amount of the pigment according to claim 3, in a paint vehicle.

9. A high infrared reflective paint composition comprising an effective amount of the pigment according to claim 5, in a paint vehicle.

10. The paint composition according to claim 7 which is substantially free of other pigments.

11. The paint composition according to claim 7 which is substantially free of other $TiO_2$-derived pigments.

12. A method of providing a surface with visual color and high IR reflectance comprising the step of coating said surface with the paint composition according to claim 7.

13. A method of providing a surface with visual color and high IR reflectance comprising the step of coating said surface with the paint composition according to claim 8.

14. A method for providing a surface with visual color and high IR reflectance comprising the step of coating said surface with the paint composition according to claim 9.

15. A plastic composition which comprises a plastic base material and an effective amount of the pigment according to claim 3.

16. A plastic composition which comprises a plastic base material and an effective amount of the pigment according to claim 5.

17. A composition which comprises a base material selected from concrete, ceramic and glass enamel, and an effective amount of the pigment according to claim 3.

* * * * *